(12) United States Patent
Dauben et al.

(10) Patent No.: US 6,387,837 B1
(45) Date of Patent: May 14, 2002

(54) POLYMERIZATION-INITIATING SUPPORTED SYSTEMS

(75) Inventors: Michael Dauben, Neuss; Martin Hoch, Solingen; Christiane Oppenheimer-Stix, Neuss; Peter Schertl, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/244,240

(22) Filed: Feb. 3, 1999

(30) Foreign Application Priority Data

Feb. 9, 1998 (DE) .......................................... 198 05 085

(51) Int. Cl.⁷ ................................................. B01J 29/04
(52) U.S. Cl. ...................... 502/87; 502/160; 502/167; 502/168; 526/126; 526/218.1; 526/219.4; 526/219.6; 526/224; 526/227; 585/943; 585/422; 585/435
(58) Field of Search .............................. 526/126, 218.1, 526/219.4, 219.6, 224, 227; 585/942, 422, 435, 943; 502/87, 160, 167, 168

(56) References Cited

U.S. PATENT DOCUMENTS

| | | | | |
|---|---|---|---|---|
| 3,971,753 A | * | 7/1976 | Frechtling et al. | 260/42.14 |
| 4,170,663 A | * | 10/1979 | Hahn et al. | 427/44 |
| 4,940,760 A | | 7/1990 | Boettcher et al. | 526/190 |
| 5,135,997 A | | 8/1992 | Feltgen et al. | 526/201 |
| 5,258,071 A | | 11/1993 | LaRoche | 106/447 |

FOREIGN PATENT DOCUMENTS

| | | |
|---|---|---|
| CA | 1282772 | 4/1991 |
| CA | 2133526 | 7/1995 |
| EP | 628 219 | 2/1989 |
| EP | 0 328 219 | * 8/1989 |
| EP | 0 798 339 | 10/1997 |
| GB | 1054125 | 1/1967 |

OTHER PUBLICATIONS

Ranucci et al., End–Functionalized Oligomers in Polymeric Materiasls Encyclopedia, vol. 3, pp. 2053–2066, 1996.*
Encyclopedia of Polymer Science & Engineering, vol. 2, pp. 1–25, 728–741.
Encyclopedia of Polymer Science & Engineering, vol. 13, pp. 708 et seq.
Ullmans Encyklopädie der technischen Chemie, vol. 13, pp 611–614.

* cited by examiner

Primary Examiner—David W. Wu
Assistant Examiner—Ling-Siu Choi
(74) Attorney, Agent, or Firm—Joseph C. Gil; Noland J. Cheung

(57) ABSTRACT

This invention relates to a process for the free-radical polymerization of monomers in gas phase or suspension processes using a supported, polymerization-initiating system comprising a) one or more polymerization-initiating components which initiate and start free-radical polymerization, b) a support, onto which said polymerization-initiating component is applied, and c) optionally, one or more modifiers which have an influence upon reaction kinetics and/or product properties.

10 Claims, No Drawings

POLYMERIZATION-INITIATING SUPPORTED SYSTEMS

FIELD OF THE INVENTION

This invention relates to a process for the free-radical polymerization of monomers in gas phase or suspension processes using a supported, polymerization-initiating system.

BACKGROUND OF THE INVENTION

The homo- and copolymerization of mono- or polyunsaturated, also conjugated dienes using ionic or free-radical initiators is of great industrial significance. For environmental reasons and due to economic considerations, there is a desire to optimize the processes used, in many cases solution processes, or to replace them with novel processes. There is a desire in this connection to polymerize the monomers in the gas phase or in suspension processes as, on the one hand, no solvents need to be used in the gas phase and emissions and waste water contamination may be reduced and, on the other, in suspension and gas phase processes, the polymers are produced in an advantageous form.

These processes may additionally be used to produce novel rubbers having particular product properties. Specifically, particularly well-dispersed fillers are obtained if these are present during polymerization as supports for the active catalyst component.

It is known (*Encyclopedia of Polymer Science & Engineering,* volume 2, pp. 1 et seq., volume 2, pp. 729 et seq. and volume 13, pp. 708 et seq.) to convert mono- or polyunsaturated monomers into polymers using cationic, anionic or free-radical initiators or using systems capable of forming such initiators. These processes are preferably performed as solution processes, in which the initiators are soluble and consequently act as efficiently as possible.

It is also known (*Ullmanns Enzyklopaedie der technischen Chemie,* volume 13, pp. 611 et seq.) that, for example, butadiene and acrylonitrile, may be converted into polymeric products using free-radical initiators or substances, which form free-radical initiators.

It is known from EP-A-0798339 that the copolymerization of butadiene and styrene may be initiated and controlled, for example, by a system comprising organolithium compound, potassium alkoxide and ether or aminofunctional compound in aliphatic solvents.

The described systems have the disadvantage that they may be used for suspension processes only if relatively elaborate arrangements are made and they cannot be used for gas phase processes.

It is already known from EP-B-0647657 that conjugated dienes, in particular butadiene, may be polymerized in the gas phase without addition of solvents by using a catalyst system based on rare earth compounds and an organoaluminium compound on a particulate, inert, inorganic solid having a specific surface area of greater than 10 $m^2/g$ (BET) and a pore volume of 0.3 to 15 ml/g.

EP-A-0419951 describes processes for the solid phase polymerization of acrylonitrile from the gas phase using free-radical initiators in the presence of solids, which act as seed substrates and into which the monomer is introduced in liquid form. The process may also be performed in the presence of mediator substances, which act as solvents or swelling agents for the resultant polymers and prevent a fall in reaction rate.

The described catalyst systems are, on the one hand, conventional Ziegler systems, for which numerous heterogenization methods are generally described in the literature and, on the other, gas phase polymerization processes requiring both special seed substrates and mediator substances.

SUMMARY OF THE INVENTION

Accordingly, the object of the present invention was to provide a generally applicable process for the free-radical polymerization of monomers in gas phase or suspension processes in order to avoid in this manner, the specific disadvantages of solution or emulsion processes.

This object is achieved according to the present invention by the use of a supported, polymerization-initiating system comprising
 a) one or more polymerization-initiation components which initiate and start free-radical polymerization,
 b) a support, onto which the polymerization-initiating component is applied, and
 c) optionally, one or more modifiers which have an influence upon reaction kinetics and/or product properties.

DETAILED DESCRIPTION OF THE INVENTION

Supporting of the polymerization-initiating substances, hereinafter referred to as initiators, preferably proceeds by applying these substances or two or more initiator components dissolved in a liquid phase onto a porous support material.

Another preferred embodiment relates to the simultaneous immobilization of initiators together with polymerization-influencing and product-modifying substances, hereinafter referred to as modifying agents.

Supporting, preferably proceeds by bringing a solvent or solvent mixture containing the initiator or initiator components in dissolved form into contact with a porous support material. The support material is inert toward the initiator or initiator components and wherein the solvent or solvent mixture may be preferably completely removed from the support or particularly preferably, the volume of the solvent or solvent mixture remaining on the support material is less than or equal to the pore volume of the support material used. In another preferred embodiment, the initiator or initiator components are applied in dissolved form onto a support and precipitated onto the support by the addition of suitable precipitating agents and are consequently, simultaneously deposited in solid form on the support.

The solid is preferably kept in motion before, during and optionally after application of the initiator solution, for example in a stirred tank with a conventional stirrer unit, such as, for example, a cross-arm stirrer or a helical stirrer or in another preferred form, in a plough bar mixer.

In another preferred embodiment, the support material is impregnated with initiator solution in a fluidized bed. In this case, the active substance solution is applied, for example by atomization by means of a nozzle, onto the support material, which is fluidized by a stream of inert gas. The inert gas, once any entrained solvent has been removed, may be returned to the reactor via an internal circuit. The inert solvent is preferably reused to prepare the active substance solution. The process according to the invention may also be advantageously performed continuously. Furthermore, it is advantageous to purposefully control the level of activity of the initiator system by varying the apportioned quantity of initiator solution and optionally, the modifying agent solution.

The supported initiator system may be produced within a wide temperature range. The temperature is preferably between the melting and boiling point of the inert solvent or solvents and below the decomposition temperature of the initiator or the initiators. Temperatures of −20 to 100° C. are preferably used, particularly preferably of 20 to 40° C.

In a preferred embodiment, after the support material has been impregnated with active substance solution, the inert solvent or solvents are removed by distillation completely or to such an extent that the volume of the remaining solvent or solvents is less than or equal to the pore volume of the support material used.

Distillation may be performed both in the same vessel in which impregnation was performed and in a separate apparatus, for example a fluidized bed drier. Depending upon the solvent used, distillation is performed at temperatures of 0 to 150° C., preferably at 10 to 70° C., and pressures of 0.001 mbar to 20 bar absolute, preferably of 0.001 mbar to standard pressure. Distillation may also be performed continuously. The condensate collected may be advantageously reused without further working up as a solvent for the active substances used in the impregnation.

Any porous support materials which are dimensionally stable and inert in the solvent or solvent mixtures being used and have a sufficiently high pore volume, surface area and particle size may be used in the process according to the present invention. Suitable support materials are particular organic or inorganic solids, the pore volume of which is between 0.1 and 15 ml/g, preferably between 0.25 and 5 ml/g, the specific surface area of which is greater than 1, preferably 10 to 1000 m$^2$/g (BET) and the grain size of which is between 10 and 2500 μm, preferably between 50 and 1000 μm.

In a preferred embodiment, mixtures of different support materials may also be used.

Specific surface area is determined in the conventional manner according to Brunauer, Emmett & Teller, J. Amer. Chem. Soc., 1938, 60, 309; pore volume is determined using the centrifugation method according to McDaniel, J. Colloid Interface Sci., 1980, 78, 31; and particle size is determined according to Cornillaut, Appl. Opt., 1972, 11, 265.

The term "inert" in this case is taken to mean that the solids or support materials are of a nature or are pre-treated in such a manner, for example by drying, that the formation of a polymerization-initiating substance is not obstructed or no unwanted reactions occur with the monomer.

Suitable organic solids are pulverulent, porous, polymeric materials, preferably in the form of free-flowing powders, having the above-stated properties. The following may be mentioned by way of example without restricting the present invention: polyolefins, such as, for example, polyethene, polypropene, polystyrene, polystyrene-co-divinylbenzene, polybutadiene, polyacrylonitrile, polyacrylates, such as for example polymethyl acrylate, polymethyl methacrylate, polyethers, such as for example polyethylene oxide, polyoxytetramethylene, polysulfides, such as for example poly-p-phenylene sulfide, or polyamides. Polypropylene, polystyrene and polyethylene oxide are particularly suitable materials. The stated organic solids which comply with the above-stated specification and are accordingly suitable for use as support materials, are described in greater detail, for example, in Ullmanns Enzyklopädie der technischen Chemie, volume 19, pp. 195 et seq. (polypropylene), volume 19, pp. 265 et seq. (polystyrene) and volume 19, pp. 31 et seq. (polyethylene oxide).

Inorganic solids, which may be mentioned by way of example, without restricting the present invention are: silica gels, precipitated silicas, clays, aluminosilicates, talcum, zeolites, carbon black, inorganic oxides, such as for example silicon dioxide, aluminium oxide, magnesium oxide, titanium dioxide, inorganic chlorides, such as, for example, magnesium chloride, sodium chloride, lithium chloride, calcium chloride, zinc chloride, or calcium carbonate. The stated inorganic solids, which comply with the above-stated specification and are accordingly suitable for use as support materials are described in greater detail, for example, in Ullmanns Enzyklopädie der technischen Chemie, volume 21, pp. 439 et seq. (silica gels), volume 23, pp. 311 et seq. (clays), volume 14, pp. 633 et seq. (carbon blacks) and volume 24, pp. 575 et seq. (zeolites).

Polymerization-initiating substances, which may be used, are any polymerization initiator systems, which are suitable for the free-radical polymerization of unsaturated monomers in the homogeneous or heterogeneous phase. Without restricting the present invention, such initiators are preferably free-radical or free-radical forming compounds or mixtures of substances, such as for example hydroperoxides, preferably cumyl hydroperoxide or tert.-butyl hydroperoxide, organic peroxides, preferably dibenzoyl peroxide, dilauryl peroxide, dicumyl peroxide, di-tert.-butyl peroxide, methyl ethyl ketone peroxide, tert.-butylbenzoyl peroxide, diisopropyl peroxydicarbonate, dicyclohexyl peroxydicarbonate, di-tert.-butyl peroxalate, inorganic peroxides, preferably potassium persulfate, potassium peroxydisulfate or hydrogen peroxide, azo compounds, preferably azobis(isobutyronitrile), 1,1'-azobis(1-cyclohexane nitrile), 4,4'-azobis(4-cyanovaleric acid) or triphenylmethylazobenzene, redox systems, preferably mixtures of peroxides and amines, mixtures of peroxides and reducing agents, optionally in the presence of metal salts and/or chelating agents. In general terms, initiator systems that may be used in the process according to the present invention are those known to the person skilled in the art from emulsion polymerization.

The initiator systems, which are preferably used, are pure or in the form of mixtures of two, three or more different initiator systems.

In another preferred embodiment, portions of the initiator system are added to the reaction separately in solid, liquid or gaseous form. This procedure is particularly suitable for redox initiator systems.

Solvents, which may be used, are any solvents in which the stated polymerization initiators are soluble and which are inert towards the initiator system components. Without restricting the present invention, the following are in particular suitable: water, alcohols, preferably methanol, ethanol, iso-propanol, butyl alcohol or amyl alcohol, ketones, preferably acetone, 2-butanone or 3-pentanone, aromatic hydrocarbons, preferably benzene and alkyl- or aryl-substituted benzene derivatives, particularly preferably toluene, xylene, diisopropylbenzene, butylbenzene, hexylbenzene, dodecylbenzene, or 1,2,3,4-tetrahydronaphthalene, linear or alkyl- or aryl-substituted aliphatic hydrocarbons, preferably acyclic hydrocarbons, particularly preferably pentane, iso-pentane, hexane, heptane, octane, nonane, decane, dodecane, tetradecane or hexadecane or cyclic hydrocarbons, particularly preferably, cyclohexane, methylcyclohexane or decahydronaphthalene.

Precipitating agents which may be used are any liquids in which the initiator or initiator components are sparingly soluble or insoluble. Without limiting the present invention, suitable precipitating agents are in particular: water, alcohols, preferably methanol, ethanol, iso-propanol, butyl alcohol or amyl alcohol, ketones, preferably acetone, 2-butanone or 3-pentanone, aromatic hydrocarbons, preferably benzene and substituted benzene derivatives, particularly preferably toluene, xylene, diisopropylbenzene, butylbenzene, hexylbenzene, dodecylbenzene, or 1,2,3,4-tetrahydronaphthalene, aliphatic hydrocarbons, preferably acyclic hydrocarbons, particularly preferably pentane, hexane, heptane, octane, nonane,,decane, dodecane, tetradecane or hexadecane, or cyclic hydrocarbons, particularly preferably, cyclohexane, methylcyclohexane or decahydronaphthalene.

Modifying agents which may be used are any substances which have an influence on the kinetics of the polymerization reaction and on the structure of the polymer, such as for example described in Ullmanns Enzyklopädie der technischen Chemie, volume 15, pp. 188 et seq. Without restricting the present invention, the following are in particular suitable: aromatic hydrocarbons, particularly preferably triphenylmethane, nitro- or nitrosoaromatics, particularly preferably nitrobenzene, nitrotoluene or nitrosobenzene, organic halogen compounds, particularly preferably tetrachloromethane, tetrabromo-methane or bromotrichloromethane, or organic sulfur compounds, preferably alkyl mercaptans and xanthogen disulfides, particularly preferably n-dodecyl mercaptan, tert.-dodecyl mercaptan, butyl mercaptan, tert.-butyl mercaptan, dibutyl disulfide, diphenyl disulfide, benzyldiethyl-dithiocarbamate or 2-phenylethyldiethyl-dithiocarbamate and carbonyl compounds, preferably ketones and aldehydes, particularly preferably acetaldehyde, propionaldehyde and acetone.

The present invention relates to the use of the supported initiator or initiator system produced according to the present invention in a process for the free-radical homo- or copolymerization of mono- or polyunsaturated monomers. Without restricting the present invention, examples of suitable monomers are preferably monounsaturated monomers, particularly preferably ethene, styrene and methylstyrene, polyunsaturated monomers, particularly preferably divinylbenzene, or unsaturated functional monomers, particularly preferably acrylonitrile, tetrafluoroethylene, methyl acrylate, methyl methacrylate, acrylamide, vinyl acetate and vinyl chloride and conjugated dienes, preferably 1,3-butadiene, isoprene or chloroprene, in suspension processes and in the gas phase.

This polymerization particularly preferably proceeds by bringing the mono- or polyunsaturated, unconjugated or conjugated monomers in gaseous form, in finely dispersed liquid form or dissolved or dispersed in a suitable diluent, into contact with the above-described initiator or initiator system supported according to the invention. Further gases may be mixed into the gaseous or atomized monomers, the gases being used for dilution, atomization or heat dissipation purposes. Polymerization may be performed at pressures of 0.001 to 1000 bar, preferably of 0.1 to 100 bar, particularly preferably of 1 to 20 bar.

Polymerization is generally performed at temperatures of −20 to 250° C., preferably at 0 to 200° C., particularly preferably at 20 to 160° C.

Polymerization may be effected in any apparatus suitable for gas phase or suspension polymerization. It is thus possible to use, for example, a stirred reactor, a rotary reactor or a fluidized bed reactor or a combination of these reactor types.

Since polymerization preferably proceeds in the gas phase or in a suspension process, it is also possible to produce very high molecular weight polymers which, because of the elevated viscosity and possibility of transfer reactions due to the solvent used, are obtainable by solution polymerization only if extremely elaborate arrangements are made.

The resultant polymers may optionally be compounded and vulcanized in the conventional manner, as is described, for example, in Encyclopedia of Polymer Science & Engineering, volume 4, pp. 66 et seq. (compounding) and volume 17, pp. 666, et seq. (vulcanization). Known phenolic or amine antioxidants or those containing sulfur or phosphorus are preferably added in order to improve heat resistance and storage stability. These are described in greater detail, for example, in Ullmanns Enzyklopädie der techn. Chemie, volume 8, pp. 19, et seq.

The following Examples are intended to illustrate the present invention for the production of supported polymerization-initiating systems and the performance of gas phase polymerizations or copolymerizations initiated therewith, but without limiting the invention to the Examples.

EXAMPLES

Example 1

Pre-treatment of the Support Material for Polymerization Initiator Systems

A silica gel (Zeosil 1165MP; commercial product of Rhône-Poulenc AG) and a polypropylene (Accurel EP100; commercial product of Akzo Nobel AG) were used as support materials for free-radical initiator systems for acrylonitrile/butadiene and styrene/butadiene polymerization. Zeosil 1165MP has a BET surface area of 140 $m^2$/g and a pore volume of 1.97 ml/g; particle diameters are between 200 and 600 $\mu$m. Accurel EP100 has a BET surface area of 50 $m^2$/g, the pore volume is 2.40 ml/g and particle diameters are between 200 and 1000 $\mu$m. Before use, 100 g of each of the support materials were dried at 0.01 mbar and room temperature and then packaged with exclusion of air and moisture.

Example 2

Production of a Silica-supported Dibenzoyl Peroxide Initiator System

Zeosil 1165MP, pre-treated according to Example 1, was used as the support material. 50 g of the substance were initially introduced into a stirred glass vessel and a solution, prepared at 20° C. of 1 g of dibenzoyl peroxide in 76 g of acrylonitrile was added dropwise by means of a dropping funnel, again at 20° C., within 30 minutes to the silica material. mixed with a magnetic stirrer. The resultant "impregnated" material remained completely fluidized throughout and no deposits were formed. The product material was then blanketed with nitrogen by passing nitrogen over the material while it was kept in gentle motion. 127 g of a free-flowing product with a loading of 8 mg of dibenzoyl peroxide per 1 g of material and additionally with 0.7 ml of acrylonitrile per 1 g of material in the pore volume were obtained.

Example 3

Production of an Acccurel-supported α,α'-azobis(isobutyronitrile) Initiator System Accurel EP100 pre-treated according to Example 1 was used as the support material. 10 g of this material were placed in a Schlenk tube, and a solution, prepared at 20° C. of 1 g of α,α'-azobis(isobutyronitrile) in 10 ml of toluene was added dropwise, again at 20° C., within 15 minutes to the support material while it was being thoroughly stirred with a magnetic stirrer. Stirring was then continued for a further 30 minutes at 20° C., wherein the resultant "impregnated" material remained completely fluidized throughout.

The product material was then dried at 20° C. by being evacuated down to 0.01 mbar while it was kept in gentle motion and was blanketed with nitrogen. 19.6 g of a free-flowing white powder with a loading of 51 mg of α,α'-azobis(isobutyronitrile) per 1 g of initiator material and additionally with 0.5 ml of toluene per 1 g of initiator material in the pore volume were obtained.

Example 4

Copolymerization of Acrylonitrile and Butadiene-in the Gas Phase

Polymerization was performed in a horizontal, 1 liter Büchi glass autoclave equipped with through-wall anchor stirrers mounted on a horizontal stirrer shaft. Before the beginning of the reaction, the reactor was pressurized to 1 bar with nitrogen. 60 g of a silica-supported initiator from Example 2, in this particular case loaded with 8 mg of dibenzoyl peroxide per 1 g of material, was conveyed through an air lock into the reactor, in which a reaction temperature of 90° C. had previously been established by jacket circulation. Immediately thereafter, gaseous butadiene was metered into the reactor, starting from a butadiene partial pressure of 6 bar. At the beginning of the reaction, the charge temperature rose to approx. 93° C., but after 5 minutes, the reaction could be performed isothermally at 90° C. over its entire course. The test was performed using a semi-batch process, i.e., only the quantity of butadiene established by the pressure drop and accordingly consumed in the reaction was constantly made up, but no further initiator and no further acrylonitrile were added and no product was discharged until the end of the test. The growth of the agitated charge could readily be observed in the glass reactor. No particle agglomeration or agglutination occurred over the course of the reaction. The test was terminated after 1½ hours, wherein once the reactor had been disassembled, 103 g of the product still containing silica were obtained. According to IR analysis, this comprised a copolymer of acrylonitrile and butadiene. This NBR rubber had an acrylonitrile fraction of just 46%.

Example 5

Copolymerization of Styrene and Butadiene in the Gas Phase

Polymerization was performed in the horizontal, 1 liter Büchi glass autoclave as described in the previous Example. 19.1 g of an Accurel-supported initiator, as described in Example 3, in this particular case loaded with 51 mg of AIBN per 1 g of material, were conveyed through an air lock into the reactor, in which a reaction temperature of 85° C. had previously been established by jacket circulation. Immediately thereafter, gaseous butadiene was metered into the reactor, starting from a butadiene partial pressure of 5 bar. Simultaneously, atomization of monomeric styrene into the reactor was begun from a storage tank via a pump. This feed could not be performed continuously, but only intermittently as, given the relatively small quantities of monomer, sufficiently fine atomization could not otherwise be achieved. The styrene was thus fed at two minute intervals in 0.2 ml portions. In the first minutes after the beginning of the reaction, i.e., until the desired butadiene partial pressure was achieved, the measured charge temperature rose to approx. 87° C., but after 5 minutes, the reaction could be performed isothermally at 85° C. over its entire course. The test was performed using a semi-batch process, i.e., on the one hand, the quantity of butadiene established by the pressure drop and accordingly, consumed in the reaction was constantly made up, wherein on the one hand the small quantity of nitrogen released by decomposition of the initiator and on the other the styrene or toluene present in the gas phase due to the low vapor pressure at the reaction temperature were disregarded. On the other hand, due to the impossibility of on-line analysis of the product, styrene was constantly introduced by atomization at the above metering rate. No further initiator was added during the course of the reaction and no product was discharged. After approx. half an hour, the stirred reactor charge passed through a tacky phase, but the material could still be thoroughly stirred using the wall-scraping stirrer. The growth of the agitated charge could readily be observed in the glass reactor over the course of the reaction. The test was terminated after 90 minutes, wherein once the reactor had been disassembled, some 38 g of the product still containing Accurel were obtained. According to IR analysis, this comprised a styrene/butadiene copolymer. This had a styrene fraction of approx. 42%, 38% of which in turn (relative to 100% styrene) were in block form. In the polybutadiene fraction, the cis content (relative to 100% polybutadiene) was 18%, the trans content 64% and the vinyl content 18%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A supported, polymerization-initiating system comprising (a) one or more free-radical polymerization-initiating components, (b) a support, onto which said polymerization-initiating component is applied, and optionally, (c) one or more modifiers which have an influence upon reaction kinetics and/or product properties, wherein the supported polymerization-initiating system initiates and starts a free-radical polymerization which proceeds in the gas phase.

2. A supported, polymerization-initiating system according to claim 1, wherein said polymerization-initiating component comprises azo compounds.

3. A supported, polymerization-initiating system according to claim 1, wherein said polymerization-initiating component comprises peroxide compounds.

4. A supported, polymerization-initiating system according to claim 1, wherein said polymerization-initiating component comprises redox systems.

5. A supported, polymerization-initiating system according to claim 1, wherein portions of said polymerization-initiating component are used separately in solid, liquid or gaseous form.

6. A supported, polymerization-initiating system according to claim 1, wherein said support comprises silica, zeolites, metal oxides or carbon black, a salt or a mixture of two or more of these components.

7. A supported, polymerization-initiating system according to claim 1, wherein said support comprises an organic support.

8. A supported, polymerization-initiating system according to claim 1, wherein said modifying agent comprises a sulfur compound, a mercaptan or a xanthogen disulfide or a mixture of two or more of these components.

9. A supported, polymerization-initiating system according to claim 1, wherein said modifying agent comprises a halogen compound.

10. A supported, polymerization-initiating system according to claim 1, wherein said modifying agent comprises a carbonyl compound.

* * * * *